United States Patent [19]

Weisenburger et al.

[11] Patent Number: 5,112,378
[45] Date of Patent: May 12, 1992

[54] BOTTOM OUTLET DEVICE FOR A GLASS MELTING FURNACE

[75] Inventors: Siegfried Weisenburger, Au/Rhein; Wolfgang Grünewald, Eggenstein; Hartmut Seiffert, Karlsruhe, all of Fed. Rep. of Germany

[73] Assignee: Kernforschungszentrum Karlsruhe GmbH, Karlsruhe, Fed. Rep. of Germany

[21] Appl. No.: 660,029

[22] Filed: Feb. 25, 1991

[30] Foreign Application Priority Data

Feb. 23, 1990 [DE] Fed. Rep. of Germany ....... 4005746

[51] Int. Cl.[5] .......................... C03B 5/26; C03B 7/08
[52] U.S. Cl. .................................. 65/327; 373/33; 373/36; 373/41
[58] Field of Search .................. 65/327, 325, 326, 126, 65/128, 129, 132; 373/27, 33, 36, 38, 41

[56] References Cited

U.S. PATENT DOCUMENTS 4,017,294  4/1977  Sanford ................................ 65/326

Primary Examiner—Richard V. Fisher
Assistant Examiner—John Hoffmann
Attorney, Agent, or Firm—Spencer, Frank & Schneider

[57] ABSTRACT

A bottom outlet device is provided for a glass melting furnace, with heating of a glass melt being effected to within the temperature range of the electrical conductivity of the melt by way of electrodes disposed in the interior of the furnace and projecting into the melt. An inductively heatable and metallic outlet unit projects from the bottom of the furnace and includes an outlet opening and an interior outlet channel communicating with the outlet opening. An outlet block comprised of ceramic bricks is disposed above the outlet unit and includes a throughgoing channel which opens toward the interior of the furnace and which is flush with the interior outlet channel of the outlet unit. A bottom electrode comprised of metal is disposed at a lowermost portion of the interior of the furnace. The bottom electrode is penetrated by a further channel which is flush with the throughgoing channel in the outlet block and is thereby in communication with the outlet opening of the outlet unit.

5 Claims, 2 Drawing Sheets

_5,112,378_

BOTTOM OUTLET DEVICE FOR A GLASS MELTING FURNACE

CROSS REFERENCE TO RELATED APPLICATIONS

The present application claims the rights of priority with respect to application Ser. No. P 40 05 746.1 filed Feb. 23, 1990 in the Federal Republic of Germany, the subject matter of which is incorporated herein by reference.

The present application is additionally related to copending U.S. application Serial No. 07/660028, filed concurrently herewith, entitled "Discharging Device for a Glass Melting Furnace," and assigned to the same assignee, the subject matter of which is incorporated herein by reference.

BACKGROUND OF THE INVENTION

The present invention relates to a bottom outlet device for a glass melting furnace, preferably for a glass melt containing highly radioactive additives, with the glass melt being heated to a temperature range in which it is electrically conductive.

A bottom outlet device of the above type is disclosed in German Patent No. 2,842,505 and corresponding U.S. Pat. No. 4,402,724.

SUMMARY OF THE INVENTION

It is now an object of the present invention to improve a glass melting furnace of the above type so that the temperature in the outlet channel and at the bottom of the melting furnace can be increased to ensure that the solidified glass will always melt and be able to flow out. Moreover, blockages or clogging of the outlet channel or channels is to be substantially avoided.

The above and other objects are accomplished according to the invention by the provision of a bottom outlet device for a glass melting furnace, with the glass melt being heated, by electrodes disposed in the interior of the furnace and projecting into the melt, to within a temperature range in which the melt is electrically conductive, including: an inductively heatable and metallic outlet unit projecting from the bottom of the furnace and including an outlet opening and an interior outlet channel communicating with the outlet opening; an outlet block comprised of ceramic bricks disposed above the outlet unit and including a throughgoing channel which opens toward the interior of the furnace and which is flush with the interior outlet channel of the outlet unit; and a bottom electrode comprised of metal and disposed at a lowermost portion of the interior of the furnace, the bottom electrode being penetrated by a further channel which is flush with the throughgoing channel in the outlet block and thereby in communication with the outlet opening of the outlet unit.

The invention makes it possible to increase the temperature in the outlet channel and at the bottom of the melting furnace by means of one or several bottom electrodes so that the solidified glass will always melt and thus the melt will be able to flow out of the furnace through the outlet unit. According to a further aspect of the invention the bottom electrode is shaped as an outlet funnel and includes several channels with different diameter openings so that blockages or clogging of the channels leading to the outlet channel in the outlet unit can be avoided. According to another aspect of the invention, radially extending channels leading to the further channel in the bottom electrode are upwardly open and therefore can be blown free of gradually occurring deposits by means a tube-shaped longitudinally extending lance which can be inserted from the top of the furnace through the melt.

DETAILED DESCRIPTION OF PREFERRED EMBODIMENTS

Figure 1:
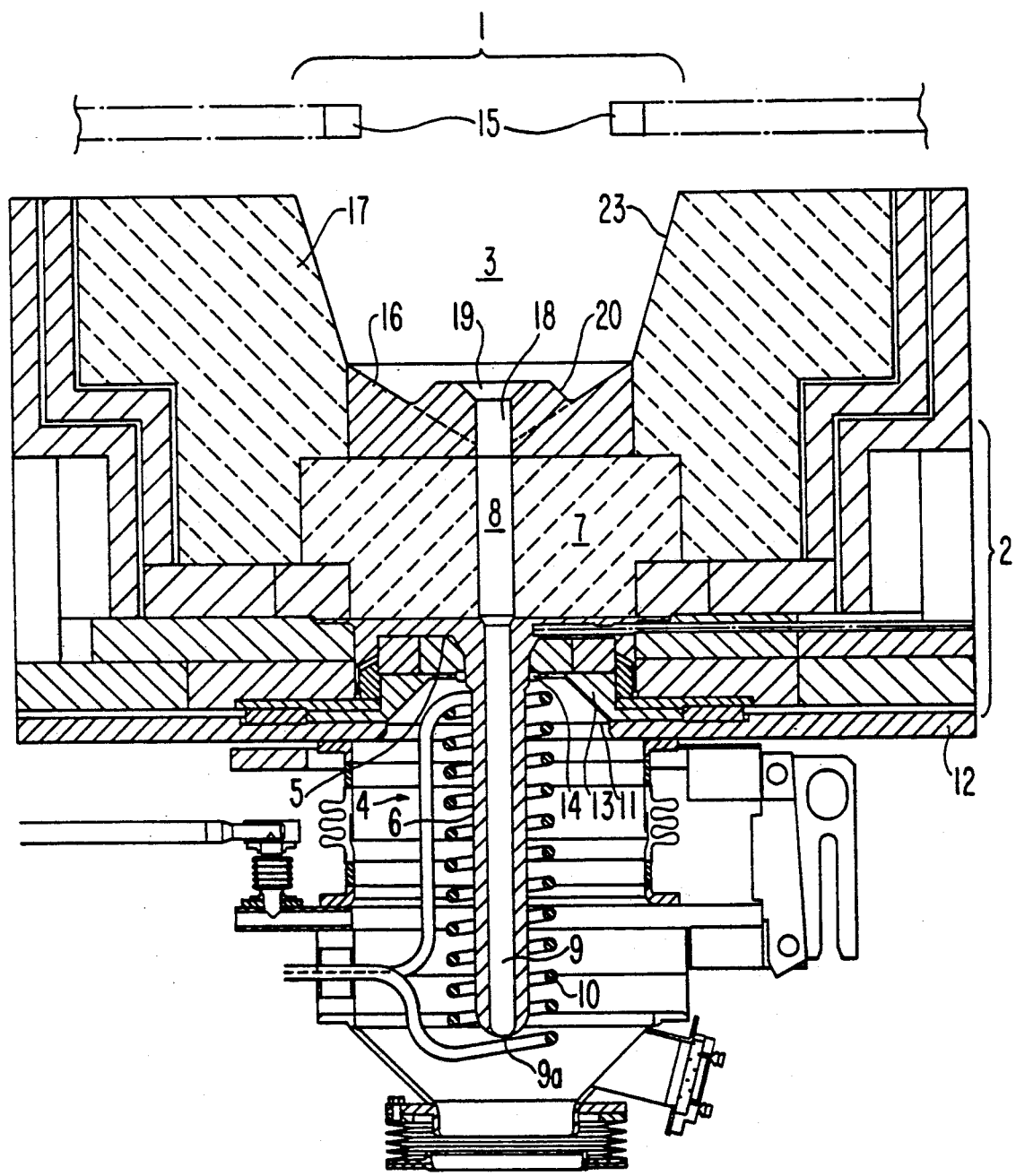
FIG. 1 is a cross-sectional view of the lower portion of a melting furnace and an outlet device according to the invention.

Referring to FIG. 1, there is shown a lower portion of a ceramic glass melting furnace 1 with the novel bottom outlet device of the invention arranged in a rotationally symmetrical manner in the bottom 2 of furnace 1. A glass melt 3, including melted-in highly radioactive wastes, is disposed in the melting end 23 of furnace 1. The furnace is heated by means of electrodes 15 shown schematically at the top of FIG. 1. The inventive outlet device includes as a principal component a rotationally symmetrical outlet unit 4 having a generally T-shaped cross section and being composed in its main portion of solid, electrically conductive material, preferably Inconel 690. The upper end of the outlet unit includes a compression flange 5 and its lower portion comprises an outlet pipe 6. Outlet unit 4 is penetrated by an outlet channel 9 which terminates in an outlet opening 9a. Outlet unit 4 is seated underneath an outlet block 7 which is penetrated by a throughgoing channel 8 that is flush with outlet channel 9. The lower portion of outlet channel within outlet pipe 6 is heated inductively by an internally cooled coil 10 encircling outlet pipe 6.

Outlet unit 4 projects through an opening 11 in a support plate 12 which carries furnace 1. Above opening 11, an annular flange 13 is seated on support plate 12 as a supporting connecting element. Annular flange 13 also has an opening 14 through which outlet pipe 6 projects at the bottom.

Figure 2:
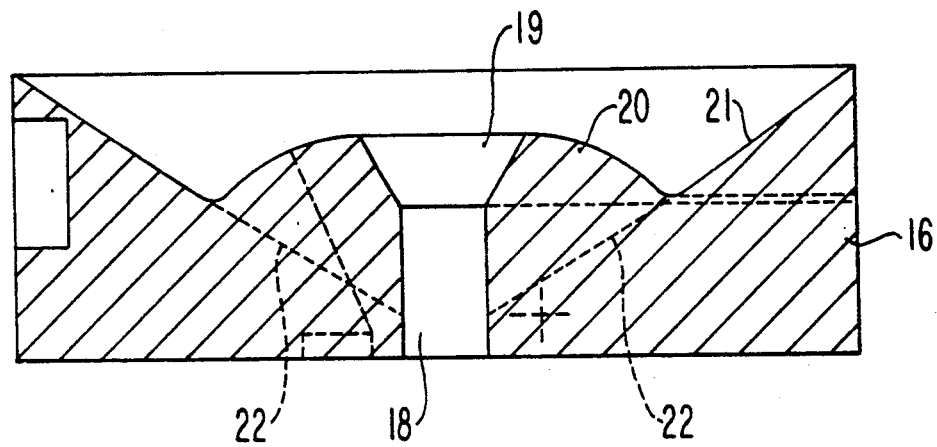
FIG. 2 is a sectional view along line AB of FIG. 3 through the bottom electrode.
Figure 3:
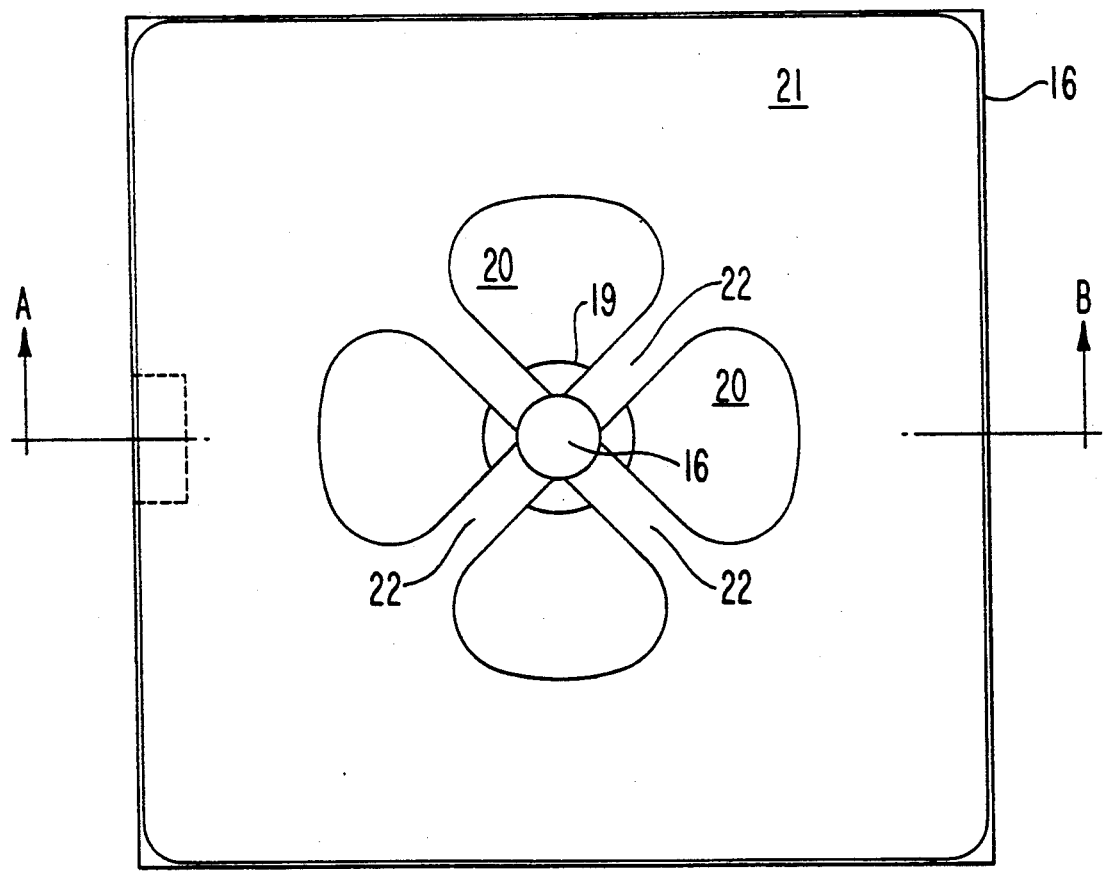
FIG. 3 is a top view of the bottom electrode shown in FIG. 1.

In operation, glass melt 3 is heated to within the temperature range in which the melt is electrically conductive by electrodes 15 disposed in the upper region of the furnace. A bottom electrode 16 is provided at the lowermost portion of furnace 1 which is lined with ceramic bricks 17. Bottom electrode 16 practically constitutes the entire bottom or, more precisely, a major portion of the bottom of the interior of the melting furnace and, in addition to its function as an additional melting electrode, accommodates a further channel 18 which is flush with throughgoing channel 8 and thus communicates with outlet opening 9a of outlet unit 4. The glass melt flows through channels 18, 8 and 9 and out outlet opening 9a as shown by the dot-dash line along the axis of the channels. Bottom electrode 16 is shown in detail and in an enlarged view in FIGS. 2 and 3.

The continuous channel formed by channels 9 and 8 which leads from outlet unit 4 through outlet block 7, opens into and follows channel 18 in bottom electrode 16 which at its upper end is provided with a conical inlet opening 19. Inlet opening 19 lies at the top of a conical bead 20 which bulges upwardly from the bottom of a funnel-shaped inlet surface 21 of bottom electrode 16.

Conical bead 20 is severed or cut away by one or a plurality of radially inwardly and preferably downwardly extending channels (grooves) 22 which connect inlet surface 21 at the bottom of bead 20 downwardly or horizontally with channel 18. Radially extending channels 22 have a cross-sectional area which is smaller than the cross sectional area of channel 18. Thus direct connections in the form of smaller cross sectional grooves are established with channel 18 so that, on the one hand, coarser impurities are retained by channels 22 and thus prevented from reaching channel 18 and, on the other hand, a noble metal sump which is allowed to form at the bottom of the melt can be removed cleanly Thus, according to the invention one or a plurality of bottom electrodes made of special steel, e.g., Inconel 690, are inserted into a central area of the lowermost portion of furnace 1, each having a channel 18 for communication with channels 8, 9. Each bottom electrode is configured in its shape and thickness of material so that, on the one hand, it meets the requirements for an inlet funnel 21 for the glass melt and, on the other hand, it can simultaneously be employed as an electrode if, for example, the temperature of the melt at the melting end of the furnace must be increased in the lower region. In case deposits, for example from a noble metal sump, have collected at the bottom of the melting furnace, these may be removed easily and completely from the bottom of the melting end thanks to the special shape of the bottom electrode. For this reason, for example, four upwardly open channels 22 having a smaller diameter than channel 18 are arranged radially around the central opening 19 which has a larger diameter than channel 18. During operation of the outlet device, possibly existing noble metal containing deposits which have become solidified can be extracted from the melting end, which extraction is reinforced by a suction effect on the shortest and most direct path through channel 18 and further channels 8 and 9.

Bottom electrode 16 and outlet unit 4 are preferably made of the same high-strength electrically conductive material, may be mutually connected to serve as electrodes, and are separated by ceramic bricks, for example those of the outlet block 7, which are of poorer electrical conductivity.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A bottom outlet device for a glass melting furnace, with heating of a glass melt taking place to within the temperature range at which the glass melt is electrically conductive by way of electrodes disposed in the interior of the furnace and projecting into the melt, comprising:
   an inductively heatable and metallic outlet unit projecting from the bottom of the furnace and including an outlet opening and an interior outlet channel communicating with said outlet opening;
   an outlet block comprised of ceramic bricks disposed above said outlet unit and including a throughgoing channel which opens toward an interior of the furnace and which is flush with the interior outlet channel of said outlet unit; and
   a bottom electrode comprised of metal and disposed at a lowermost portion of the interior of the furnace and seated above said outlet block, said bottom electrode being penetrated by a further channel which is flush with the throughgoing channel in said outlet block and thereby is in communication with the outlet opening of said outlet unit.

2. The bottom outlet device as defined in claim 1, wherein said outlet unit and said bottom electrode are electrically separated from one another by the ceramic bricks of said outlet block.

3. The bottom outlet device as defined in claim 1, wherein: said bottom electrode has an upwardly opening funnel-shaped inlet surface with a conical bead bulging upwardly from the bottom of said funnel-shaped surface; the further channel in said bottom electrode opens into the interior of the furnace at the top of said bead by way of a conical inlet opening; and the bottom of said funnel-shaped inlet surface includes at least one radially inwardly leading channel extending through said upwardly bulging conical bead and opening into said further channel, with the cross-sectional area of said at least one radially leading channel being smaller than the cross sectional area of said further channel.

4. The bottom outlet device as defined in claim 3, wherein said radially leading channel extends downwardly toward said further channel.

5. The bottom outlet device as defined in claim 3, wherein said radially leading channel is upwardly open.

* * * * *